US009523979B2

(12) United States Patent
Hashizume et al.

(10) Patent No.: US 9,523,979 B2
(45) Date of Patent: Dec. 20, 2016

(54) NUMERICAL CONTROL DEVICE

(75) Inventors: Yuki Hashizume, Chiyoda-ku (JP); Masahiro Ozawa, Chiyoda-ku (JP); Junichi Kamata, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 202 days.

(21) Appl. No.: 14/378,533

(22) PCT Filed: May 9, 2012

(86) PCT No.: PCT/JP2012/061920
§ 371 (c)(1),
(2), (4) Date: Aug. 13, 2014

(87) PCT Pub. No.: WO2013/168251
PCT Pub. Date: Nov. 14, 2013

(65) Prior Publication Data
US 2015/0032247 A1 Jan. 29, 2015

(51) Int. Cl.
G05B 19/18 (2006.01)
G05B 19/4063 (2006.01)

(52) U.S. Cl.
CPC ......... G05B 19/182 (2013.01); G05B 19/4063 (2013.01); G05B 2219/50063 (2013.01)

(58) Field of Classification Search
CPC .............. G05B 19/182; G05B 19/4063; G05B 2219/50063
See application file for complete search history.

(56) References Cited

U.S. PATENT DOCUMENTS 3,664,066 A * 5/1972 Clark, Jr. ............... B24B 49/00
451/14
4,027,245 A * 5/1977 Bourrat ................. B24B 17/10
451/251

(Continued)

FOREIGN PATENT DOCUMENTS

JP 63-79110 A 4/1988
JP 2-38604 U 3/1990

(Continued)

OTHER PUBLICATIONS

Communication dated Jun. 22, 2015, issued by the German Patent and Trademark Office in corresponding German Application No. 11 2012 006 076.8.

(Continued)

Primary Examiner — Ramesh Patel
(74) Attorney, Agent, or Firm — Sughrue Mion, PLLC; Richard C. Turner

(57) ABSTRACT

A numerical control device inputs a machining program to control an operation of a machine tool and outputs feedback data obtained as a result of the operation of the machine tool. The numerical control device includes a machining-program analysis unit that analyzes the machining program having a machining shape command to which a mark or a specific program command is attached and that outputs a marking instruction; a delay unit that delays the marking instruction until the feedback data indicating a result of an operation of the machine tool based on the machining shape command is obtained; and a feedback-data output unit that, when having detected the feedback data and the delayed marking instruction, executes, onto the feedback data, marking corresponding to the mark or the specific program command attached to the machining shape command and outputs the feedback data.

5 Claims, 11 Drawing Sheets

(56) References Cited

U.S. PATENT DOCUMENTS

| | | | | |
|---|---|---|---|---|
| 5,249,045 | A * | 9/1993 | Lemelson | B07C 5/10 348/92 |
| 6,198,246 | B1 * | 3/2001 | Yutkowitz | G05B 11/42 318/561 |
| 2002/0120921 | A1 * | 8/2002 | Coburn | G05B 19/41885 717/140 |
| 2004/0073404 | A1 * | 4/2004 | Brooks | G05B 19/409 702/183 |
| 2004/0093191 | A1 * | 5/2004 | Jeppsson | G01N 29/12 703/1 |
| 2005/0215176 | A1 * | 9/2005 | Sakagami | B24B 47/10 451/5 |
| 2005/0238043 | A1 * | 10/2005 | Altpeter | G05B 19/4061 370/445 |
| 2005/0278670 | A1 * | 12/2005 | Brooks | G05B 19/409 703/6 |
| 2007/0046677 | A1 * | 3/2007 | Hong | G05B 19/41 345/442 |
| 2007/0085850 | A1 * | 4/2007 | Hong | G05B 19/41 345/442 |
| 2007/0091094 | A1 * | 4/2007 | Hong | G05B 19/41 345/474 |
| 2012/0296462 | A1 * | 11/2012 | Otsuki | G05B 19/4069 700/104 |

FOREIGN PATENT DOCUMENTS

| | | |
|---|---|---|
| JP | 6-86580 A | 3/1994 |
| JP | 8-137530 A | 5/1996 |
| JP | 10-133727 A | 5/1998 |
| JP | 2003-316406 A | 11/2003 |
| JP | 2005-11203 A | 1/2005 |
| JP | 2009-53744 A | 3/2009 |

OTHER PUBLICATIONS

International Search Report for PCT/JP2012/061920 Aug. 14, 2012.

* cited by examiner

NUMERICAL CONTROL DEVICE

CROSS REFERENCE TO RELATED APPLICATIONS

This application is a National Stage of International Application No. PCT/JP2012/061920 filed May 9, 2012, the contents of which are incorporated herein by reference in their entirety.

FIELD

The present invention relates to a numerical control (hereinafter, NC) device that outputs feedback data from an amplifier.

BACKGROUND

An NC device is conventionally configured to compare the entirety of position feedback data from an amplifier with the entirety of program command data or parameter references of a machining program. The NC device compares only shapes of respective pieces of the program command data with the feedback data without performing comparison of data as time-series data (see, for example, Patent Literature 1 mentioned below).

The NC device is also configured to store the position of a machine at a time when a specific command in a machining program is issued, and stores an issuance timing of the specific command in the machining program and a machine position only of that time associated with each other (see, for example, Patent Literature 2 mentioned below).

The NC device is also configured to place specific marks or commands on interested parts in a machining program, and outputs only data of the parts in which the specific marks or commands are described (see, for example, Patent Literature 3 mentioned below).

CITATION LIST

Patent Literatures

Patent Literature 1: Japanese Patent Application Laid-open No. 2003-316406 (page 29, FIG. 30)
Patent Literature 2: Japanese Patent Application Laid-open No. H10-133727 (page 6, FIG. 1)
Patent Literature 3: Japanese Patent Application Laid-open No. S63-79110 (page 3, FIG. 2)

SUMMARY

Technical Problem

However, according to the technique disclosed in Patent Literature 1 mentioned above, a correspondence between program commands in the machining program and the feedback data as a vast amount of time-series data from the amplifier is ignored. Therefore, from which feedback data to which feedback data corresponds to a certain program command is not known and thus phase (timing) alignment with feedback data (trajectory data or shape data) that is a result of an operation according to a program command cannot be performed accurately and finely with respect to each program command.

According to the technique disclosed in Patent Literature 2 mentioned above, when program commands are caused to correspond to feedback data from an amplifier, an analyzer of feedback data or a device external to the NC device does not know internal processing of the NC device. Therefore, how much delay occurs from an analysis of a program command in a machining program until the machine actually operates and then the result appears in output feedback data is unknown and accordingly the correspondence between the program commands and the feedback data established by a manual operation or the external device is not always correct. Furthermore, the operation needs time and effort.

According to the technique disclosed in Patent Literature 3 mentioned above, when whether to output data is changed by marking and if data that has not been output becomes required, effort to re-describe the program to output the required data and then to perform output of data again is needed.

The present invention has been achieved in view of the above problems, and an object of the present invention is to provide a numerical control device capable of executing, onto feedback data, marking indicating a correspondence with machining shape commands.

Solution to Problem

The present invention is directed to a numerical control device that achieves the object. The numerical control device inputs a machining program to control an operation of a machine tool and outputs feedback data obtained as a result of the operation of the machine tool. The numerical control device includes a machining-program analysis unit that analyzes the machining program having a machining shape command to which a mark or a specific program command is attached and that outputs a marking instruction; a delay unit that delays the marking instruction until the feedback data indicating a result of an operation of the machine tool based on the machining shape command is obtained; and a feedback-data output unit that, when having detected the feedback data and the delayed marking instruction, executes, onto the feedback data, marking corresponding to the mark or the specific program command attached to the machining shape command and outputs the feedback data.

Advantageous Effects of Invention

The NC device according to the present invention is capable of executing, onto feedback data, marking indicating a correspondence with machining shape commands.

DESCRIPTION OF EMBODIMENTS

Exemplary embodiments of a numerical control device according to the present invention will be explained below in detail with reference to the accompanying drawings. The present invention is not limited to the embodiments.

First Embodiment

Figure 1:
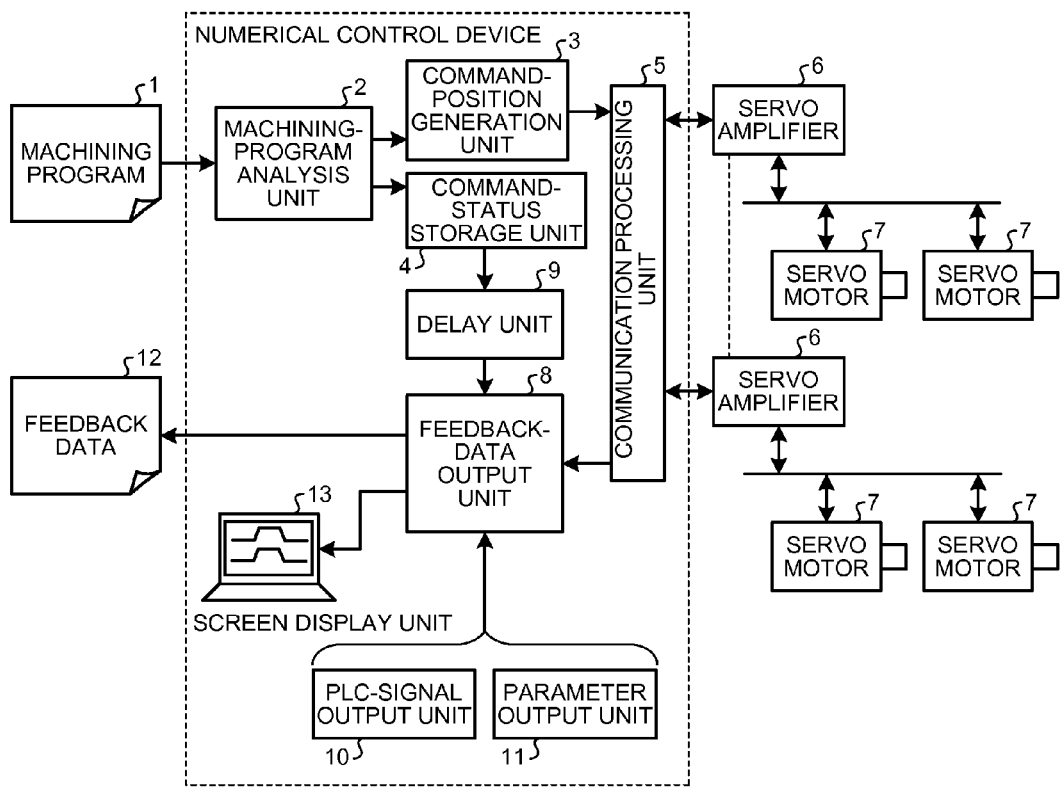
FIG. 1 is a block diagram of a configuration example of an NC device.

FIG. 1 is a block diagram of a configuration example of an NC device according to a first embodiment of the present invention. Reference sign 1 denotes a machining program, 2 denotes a machining-program analysis unit, 3 denotes a command-position generation unit, 4 denotes a command-status storage unit, 5 denotes a communication processing unit, 6 denotes a servo amplifier, 7 denotes a servo motor, 8 denotes a feedback-data output unit, 9 denotes a delay unit, 10 denotes a PLC (Programmable Logic Controller)-signal output unit, 11 denotes a parameter output unit, 12 denotes feedback data, and 13 denotes a screen display unit.

The machining program 1 has machine-tool positioning commands (G00, for example) and machining shape commands (G01 and G02, for example). The machining-program analysis unit 2 analyzes the machining program 1 in units of blocks, transmits movement data of the machine tool extracted as a result of the analysis to the command-position generation unit 3, and transmits a marking instruction to the command-status storage unit 4 when an analyzed block includes a mark or a command corresponding to marking. The command-position generation unit 3 performs interpolation processing and acceleration/deceleration processing for the movement data received from the machining-program analysis unit 2 and generates a command position to be transmitted to the communication processing unit 5. The command-status storage unit 4 stores therein presence or absence of a marking instruction received from the machining-program analysis unit 2 and transmits stored information of the marking instruction to the delay unit 9. The communication processing unit 5 transmits the command position data received from the command-position generation unit 3 to the servo amplifier 6 and transmits feedback data 12 as results of machine operations according to machining program commands received from the servo amplifier 6 to the feedback-data output unit 8 with a certain period (a sampling period).

The servo amplifier 6 drives the servo motor 7 according to the command position information received from the communication processing unit 5 and transmits feedback data 12 as a result of the driving of the servo motor 7 to the communication processing unit 5. The servo motor 7 rotates based on driving information received from the servo amplifier 6 and transmits a result of actual driving to the servo amplifier 6. The feedback-data output unit 8 receives the feedback data 12 from the communication processing unit 5 with the certain sampling period and executes marking onto the received feedback data 12 according to a marking instruction from the delay unit 9 of that time. The feedback-data output unit 8 also outputs the feedback data 12 subjected to the marking processing to the screen display unit 13 and an external storage device (not shown). The delay unit 9 transmits the marking instruction information received from the command-status storage unit 4 to the feedback-data output unit 8.

Figure 2:
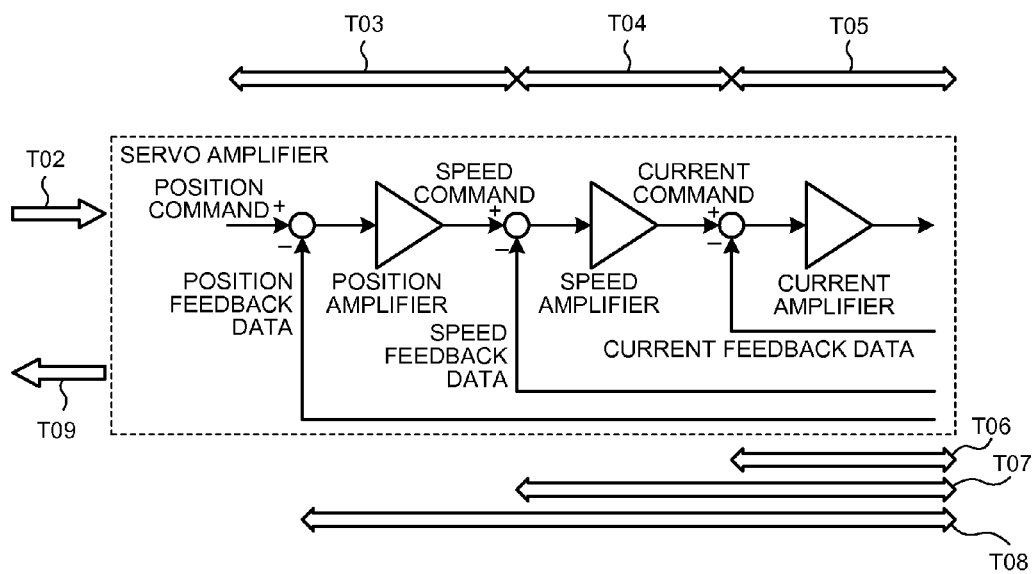
FIG. 2 shows processing of a servo amplifier and an execution time thereof.

At this time, the delay unit 9 delays transmission of the marking instruction information in order to match a timing when the transmitted marking instruction information is received by the feedback-data output unit 8 with a timing when the feedback-data output unit 8 starts receiving the feedback data 12, which is a result obtained by a machine that has operated according to a positioning command or a machining shape command in a block of the machining program as a marking instruction source. FIG. 2 shows processing of the servo amplifier and an execution time thereof. As shown in FIG. 2, a delay provided by the delay unit 9 is determined in consideration of various times such as a time T02 in which information is transmitted from the NC device to the servo amplifier 6, a processing time T03 in which a position command is converted into a speed command, a processing time T04 in which a speed command is converted into a current command, a time T05 required until the machine operates after a current command is generated, a time T06 required until a current feedback is obtained after the machine operates, a time T07 required until a speed feedback is obtained after the machine operates, a time T08 required until a position feedback is obtained after the machine operates, and a time T09 in which information is transmitted from the servo amplifier 6 to the NC device.

The PLC-signal output unit 10 changes an output of a PLC signal according to contents of a command read from the machining program 1. The parameter output unit 11 changes an output of a parameter according to contents of a command read from the machining program 1. A configuration including any one of the PLC-signal output unit 10 and the parameter output unit 11 can be alternatively used. The feedback data 12 is output to the external storage device to compare an operation result of the machine with a program command and is analyzed by an operator. The screen display unit 13 displays a program command or the feedback data 12 as a list of numbers or waveform data on a screen.

Figure 3:
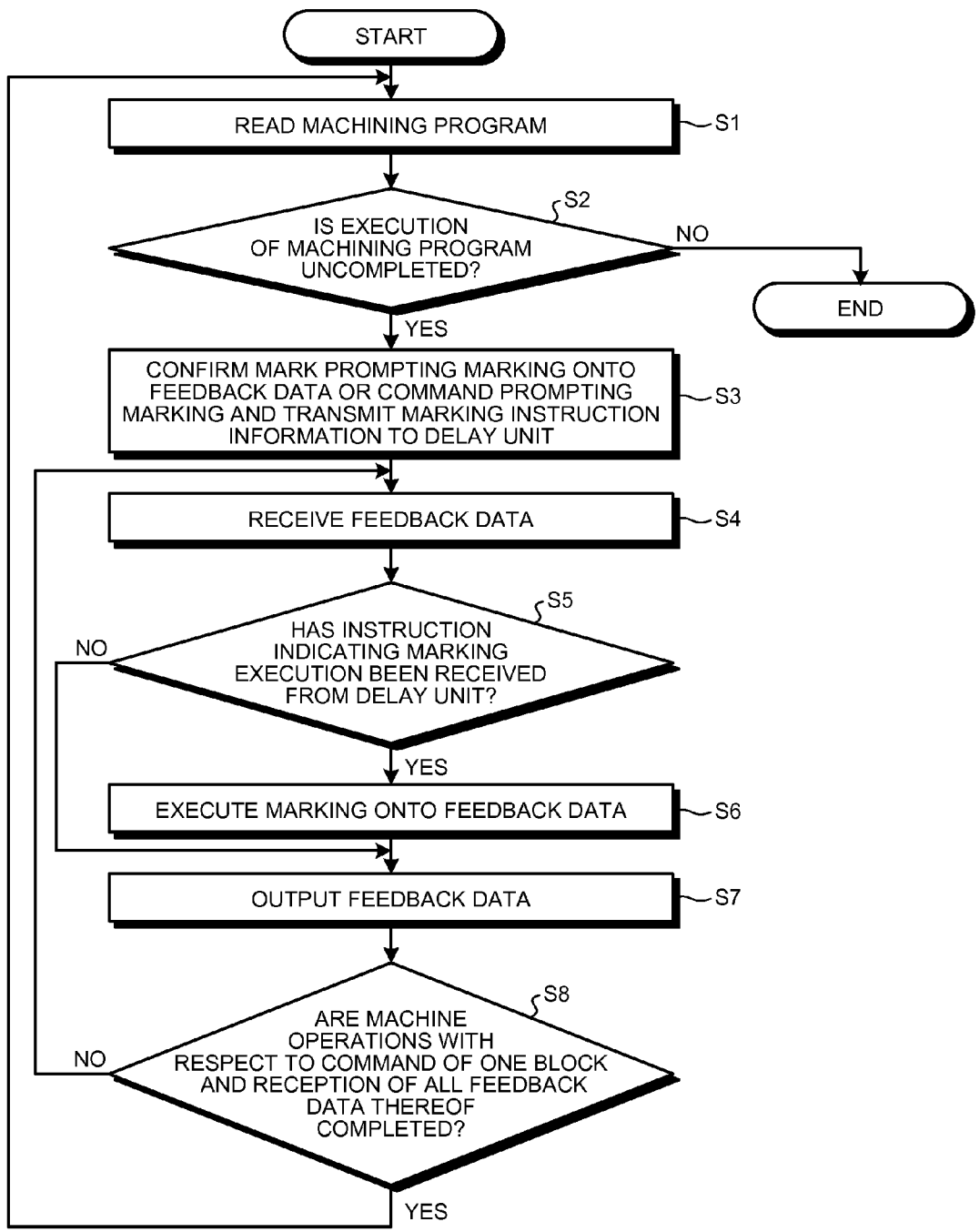
FIG. 3 is a flowchart showing reading of a machining program and marking processing onto feedback data according to a first embodiment.

An operation of the NC device in a case where marks or commands instructing marking onto the feedback data 12 are described in the machining program 1 is explained next with reference to FIG. 3. FIG. 3 is a flowchart showing reading of a machining program and marking processing onto feedback data according to the present embodiment.

First, the machining-program analysis unit 2 first reads data of the machining program 1 in units of blocks (Step S1). Only processing related to marking is explained below. Because processing of position information generated according to a program command, which is performed at the same time, is identical to that of conventional techniques, explanations thereof will be omitted.

The machining-program analysis unit 2 proceeds to Step S3 when reading up to the end of the machining program 1 is uncompleted (YES at Step S2), and ends the processing when reading up to the end of the machining program 1 is completed and there is no command to be executed (NO at Step S2).

Figure 4:
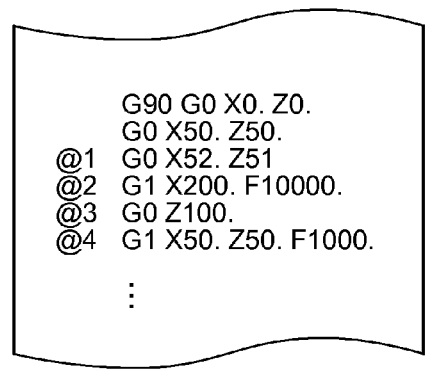
FIG. 4 shows a description example of a machining program according to the first embodiment.

The machining-program analysis unit 2 checks whether a block of the read machining program 1 includes a mark that prompts marking onto the feedback data 12 or a command that prompts the marking and transmits marking instruction information to the delay unit 9 (Step S3). FIG. 4 shows a description example of a machining program according to the present embodiment. While marking onto the feedback data 12 is prompted using marks "@+number" ("@1", "@2", and the like are shown in FIG. 4) in the machining program 1 shown in FIG. 4, a way to prompt marking is not limited thereto. A program command such as a sequence number or an M code can be used as a command that prompts marking. In this case, marking onto the feedback data 12, which is described later, is also replaced with a sequence number or an M code. When there is no command or mark prompting marking onto the feedback data 12, the machining-program analysis unit 2 transmits instruction information indicating that marking is not executed onto the feedback data 12 to the delay unit 9.

The feedback-data output unit 8 then receives the feedback data 12 from the servo amplifier 6 through the communication processing unit 5 with the sampling period (Step S4).

When receiving instruction information indicating marking execution from the delay unit 9 (YES at Step S5), the feedback-data output unit 8 executes marking onto the feedback data 12 received through the communication processing unit 5 (Step S6) and outputs the feedback data 12 with marking (Step S7). Meanwhile, when receiving instruction information indicating not executing marking from the delay unit 9 (NO at Step S5), the feedback-data output unit 8 outputs the feedback data 12 to an external storage device (not shown) without executing marking onto the feedback data 12 (Step S7).

The feedback-data output unit 8 confirms whether reception of the feedback data 12 of all machine operations with respect to a command of one block read at Step S1 is completed, that is, whether machine operations according to a certain command are completed (Step S8). When the reception and the machine operations are completed (YES at Step S8), the processing returns to Step S1 and then the machining-program analysis unit 2 reads the next block (command) of the machining program 1. Meanwhile, when the reception and the machine operations are not completed (NO at Step S8), the processing returns to Step S4 and then the feedback-data output unit 8 receives the next piece of the feedback data 12. Completion of a command of one block can be confirmed by monitoring completion signals of various commands and the like.

In this way, with respect to the feedback data 12 when the machine operates according to a command of each block in the machining program 1, the NC device can obtain the feedback data 12 with marking executed at an accurate timing.

In the above explanations, the feedback data 12 is output to the external storage device (not shown). However, also when commands on a program and the feedback data 12 are displayed on the screen display unit 13 as a list of numbers or when waveforms generated from commands on a program and the feedback data 12 are displayed on the screen display unit 13, the commands on the program and the feedback data 12 can be compared with each other as time-series data by applying or utilizing a marking result.

Figure 5:
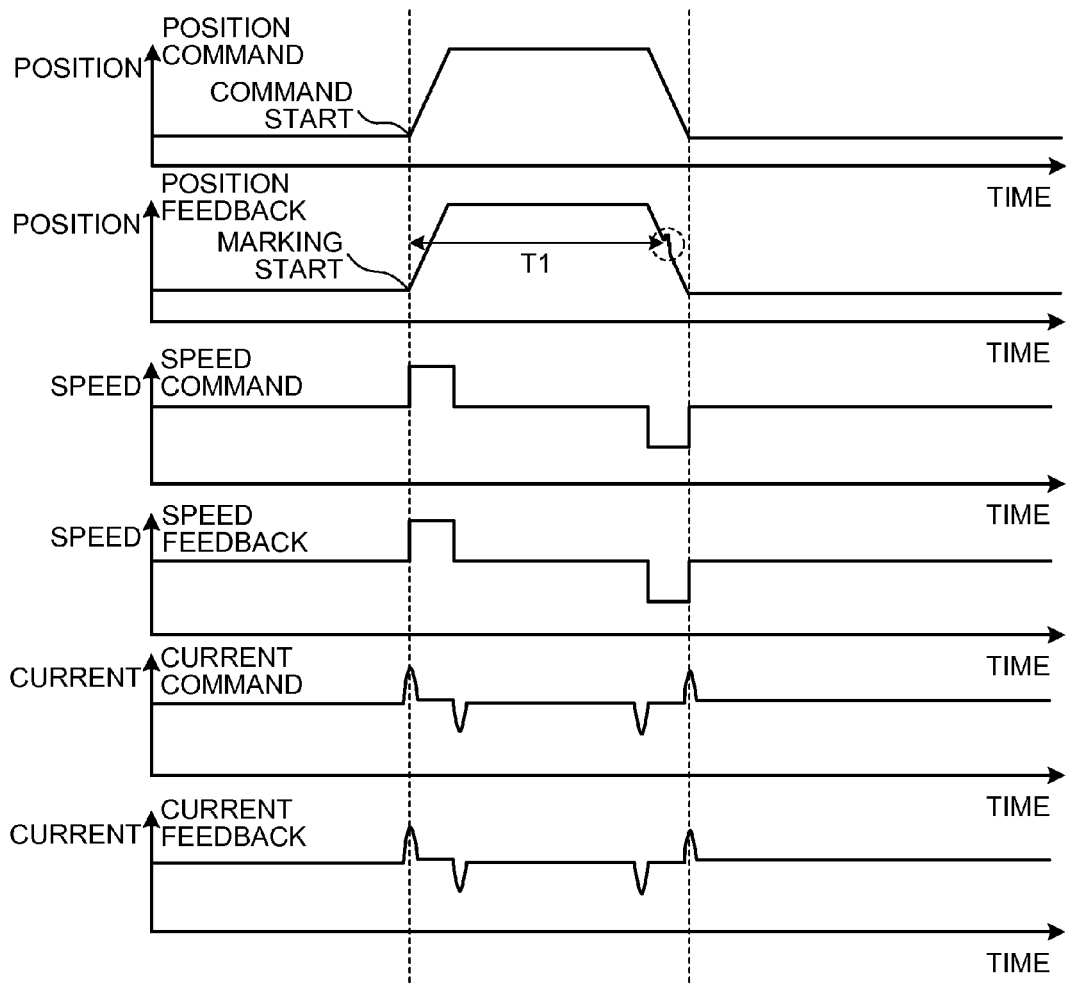
FIG. 5 shows position, speed, and current commands generated by a servo amplifier and feedback data thereof as waveforms of time-series data.

FIG. 5 shows position, speed, and current commands generated by a servo amplifier and feedback data thereof as waveforms of time-series data. The horizontal axis represents the time and the vertical axis represents the size of each category. When attention is focused on marking in this way, a timing when the machine operates according to commands is clarified and thus it is possible to align timings of the start of commands according to the program and timings of the start of marking onto the feedback data 12, thereby accurately and easily causing the data to correspond to each other as time-series data and to compare the data with each other. Accordingly, it can be also known how much time an operation according to which command has been performed at occurrence of misalignment between the command and the feedback (T1 in FIG. 5). When movement commands of a minute segment are issued at short time intervals, it can be easily specified particularly which command has been issued when misalignment between the command and an actual machine operation occurs.

As shown in FIG. 5, the feedback data 12 can be current data, speed data, and the like, in addition to position data. For example, when there is no misalignment between a speed command and a speed feedback and there is misalignment between a position command and position feedback data 12, factors of the difference between the command and the feedback data 12 can be narrowed down by comparing the command with other pieces of the feedback data 12 than the position feedback data, such as by confirming whether there is a problem caused by position misalignment of the machine due to a backlash error or a pitch error. This can be applied also to a system in which a position command or position feedback data is not input to a control system and that executes a control using only the speed or the current.

Figure 6:
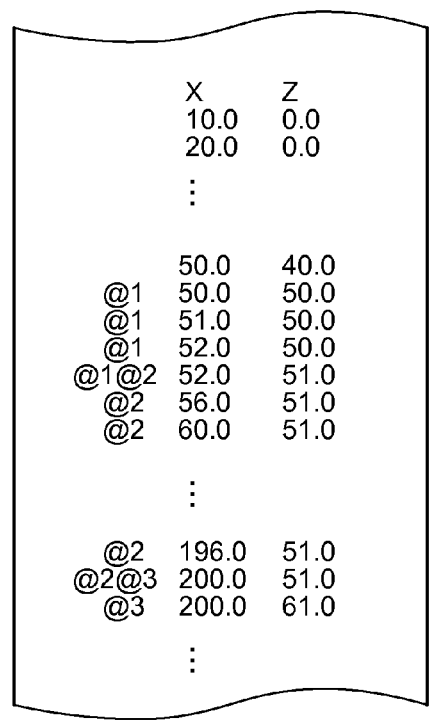
FIG. 6 shows an output example of feedback data output by an NC device according to the first embodiment.

FIG. 6 shows an output example of feedback data output by the NC device according to the present embodiment. In FIG. 6, "@1", "@2", and the like are results of marking executed onto the feedback data 12. In this example, while the feedback data 12 as results of machine operations corresponding to commands of blocks of the machining program 1 to which marking instructions are issued are received, identical marking to that on the machining program 1 being the instruction source is executed onto the feedback data 12.

Although the marking is executed onto the feedback data 12 by using the same marks as those on the machining program in the above explanations, it is alternatively possible to execute marking onto the feedback data 12 by using different marks from those on the machining program 1. Under the situation, a correspondence rule between the marks on the machining program 1 and the marks on the feedback data 12 has to be defined.

Figure 7:
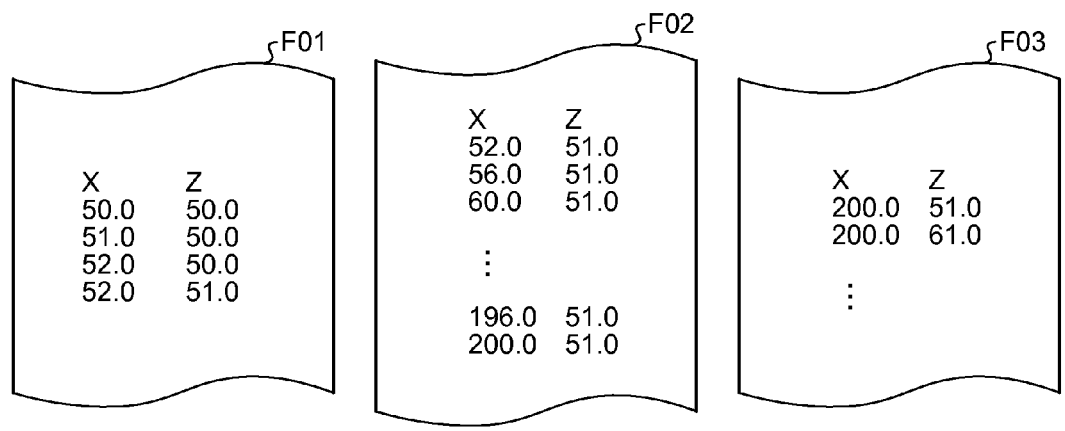
FIG. 7 shows an output example of feedback data output by the NC device according to the first embodiment.

While the correspondence between the machining program 1 and the feedback data 12 is established through marking in the above explanations, it is alternatively possible to output the feedback data 12 as data files differing according to the types of marks. FIG. 7 shows an output example of feedback data output by the NC device according to the present embodiment. As shown in FIG. 7, with respect to the machining program 1 shown in FIG. 4, the feedback data 12 can be divided into separate data files such as a data file "F01" of the feedback data 12 including only the feedback data 12 to which "@1" is attached, a data file "F02" of the feedback data 12 including only the feedback data 12 to which "@2" is attached, and a data file "F03" of the feedback data 12 including only the feedback data 12 to which "@3" is attached, as a substitute for marking.

As explained above, according to the present embodiment, by focusing attention on marking executed onto feedback data, the NC device can draw feedback data of a time when the machine starts operating according to a command. Therefore, commands according to a program and the feedback data can be accurately and easily caused to correspond to each other and then compared with each other as shown in FIG. 5. Furthermore, how much time an operation according to which command has been performed at occurrence of a difference between the command and the feedback can be easily known. Accordingly, also when movement commands on a minute segment are issued at short time intervals, it can be easily specified which command has been issued when misalignment between the command and an actual machine operation occurs.

In this way, the NC device is configured to accurately and easily determine a correspondence between each of program commands in a machining program and feedback data as a vast amount of time-series data from an amplifier through marking onto the feedback data, and the feedback data is configured to be subjected to marking indicating linking with the commands of the machining program. The NC device can accurately and easily cause a command trajectory according to the program to correspond to an operation trajectory of the machine as the time-series data to perform a comparison therebetween, can easily know how much time an operation according to which command has been performed at occurrence of a problem in a machining result, and can reduce a time required to establish a correspondence between the commands and machining results and a dead time caused by a return occurring due to an erroneous correspondence therebetween. Therefore, work efficiency can be improved.

Second Embodiment

In a second embodiment of the present invention, whether to execute marking onto feedback data to be output can be selected. In the present embodiment, elements different from those of the first embodiment are explained.

Figure 8:
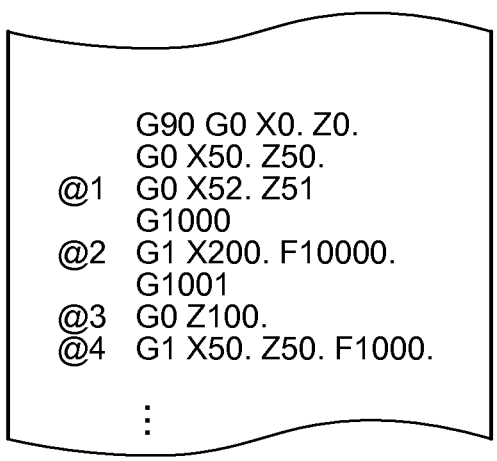
FIG. 8 shows a description example of a machining program according to a second embodiment.

The NC device has an identical configuration to that in the first embodiment (see FIG. 1). FIG. 8 shows a description example of a machining program according to the present embodiment. In the machining program 1, "G1000" is used as a program command indicating the start of marking and "G1001" is used as a program command indicating the end of the marking.

Figure 9:
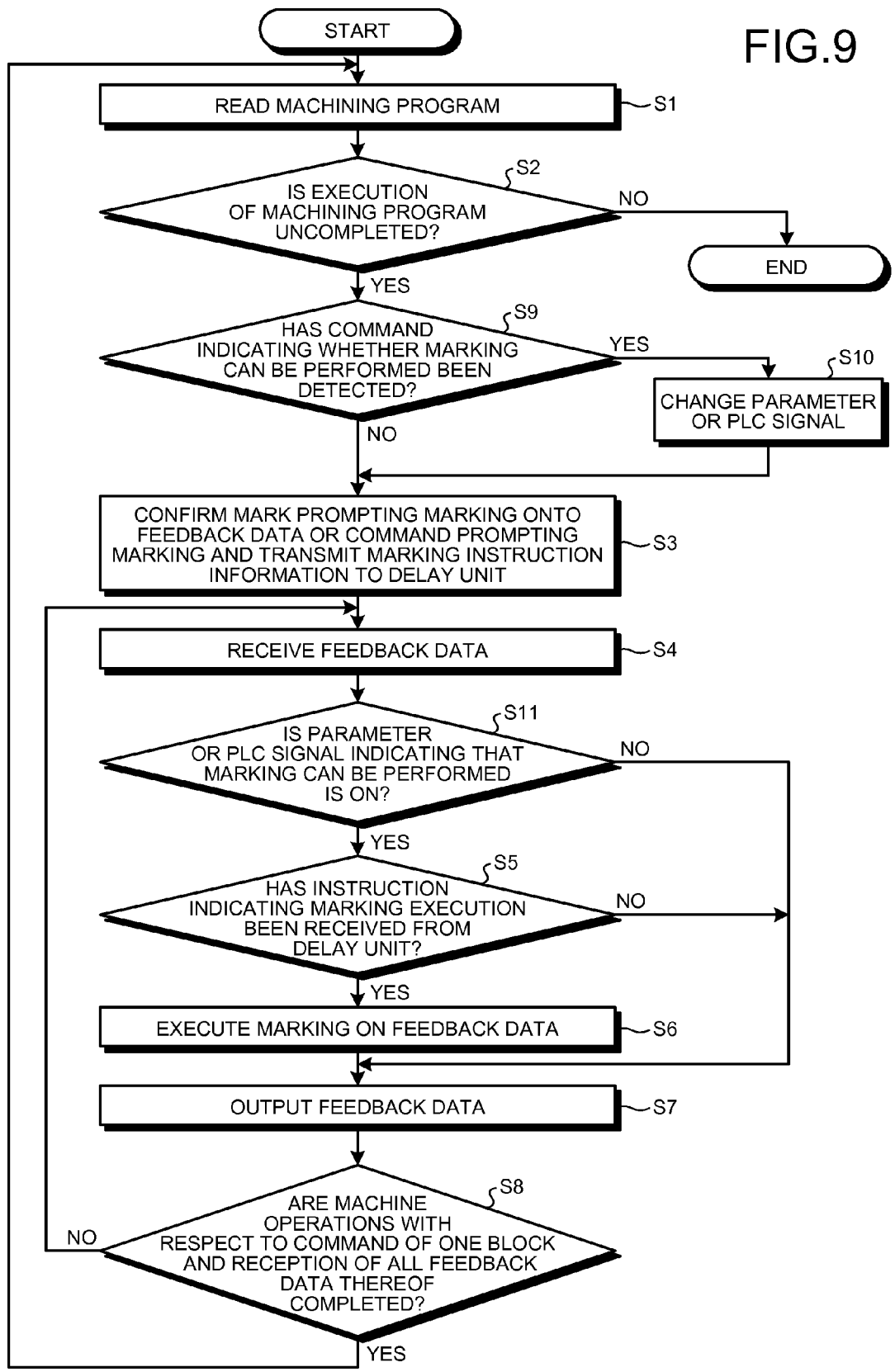
FIG. 9 is a flowchart showing reading of a machining program and marking processing onto feedback data according to the second embodiment.

An operation of the NC device in a case where marks or commands instructing marking onto the feedback data 12 are described in the machining program 1 is explained next with reference to FIG. 9. FIG. 9 is a flowchart showing reading of a machining program and marking processing onto feedback data according to the present embodiment.

When reading up to the end of the machining program 1 is uncompleted (YES at Step S2), the machining-program analysis unit 2 then confirms whether "G1000" or "G1001" indicating whether marking can be executed or not, respectively, is detected (Step S9). When "G1000" or "G1001" is detected (YES at Step S9), the machining-program analysis unit 2 changes the status of a parameter or the PLC signal (Step S10). For example, in the case of the PLC signal, the machining-program analysis unit 2 sets the PLC signal ON in the PLC-signal output unit 10 upon detection of "G1000", and sets the PLC signal OFF in the PLC-signal output unit 10 upon detection of "G1001". A parameter from the parameter output unit 11 can be substituted for the PLC signal. When neither "G1000" nor "G1001" is detected (NO at Step S9) or the status of the parameter or the PLC signal is changed (Step S10), the machining-program analysis unit 2 proceeds to Step S3.

Upon reception of the feedback data 12 (Step S4), the feedback-data output unit 8 confirms whether the status of the parameter or the PLC signal indicating marking is ON (Step S11). When the status is ON (YES at Step S11), the feedback-data output unit 8 proceeds to Step S5. The following processes are identical to those in the first embodiment. When the status is OFF (NO at Step S11), the feedback-data output unit 8 outputs the feedback data 12 to the external storage device without executing marking onto the feedback data 12 (Step S7). The parameter from the parameter output unit 11 can be substituted for the PLC signal.

Figure 10:
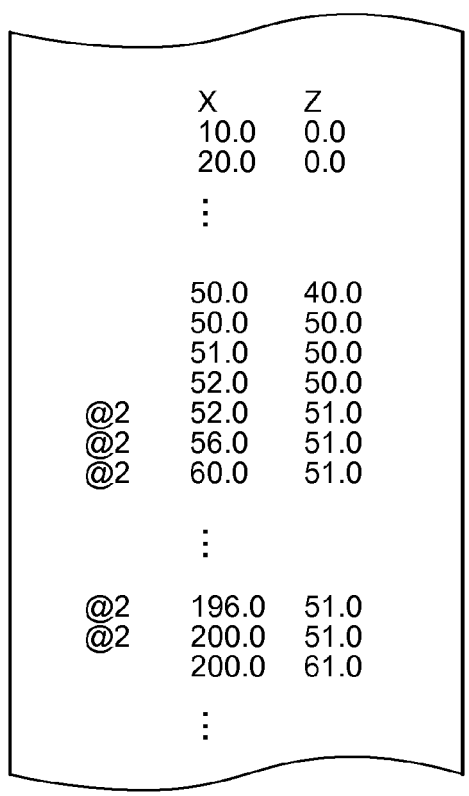
FIG. 10 shows an output example of feedback data output by an NC device according to the second embodiment.

FIG. 10 shows an output example of feedback data output by the NC device according to the present embodiment, onto which marking is executed according to the machining program 1 shown in FIG. 8. Among commands attached with marks ((@+number) prompting marking, marking is executed particularly only onto the feedback data 12 of commands within a range enclosed by "G1000" and "G1001".

As explained above, in the NC device according to the present embodiment, whether to execute marking onto the feedback data can be externally selected using a program command and a parameter or the PLC signal. Accordingly, also when there is a mechanism or an analysis device that can use only feedback data output from a conventional NC device that does not have a marking function, feedback data including no marking can be obtained as in the conventional NC device by changing a parameter or the PLC signal with no effort to eliminate marking onto the program and the like, in addition to the effect of the first embodiment. Furthermore, a marking execution range in the machining program can be easily changed.

In this way, in the NC device, whether to execute marking onto the feedback data can be externally selected and thus, even when there are two requests of a case where marking is required and a case where marking is not required, these requests can be addressed by one NC device according to the present embodiment. Furthermore, a method of marking onto the feedback data can be changed without changing marking information in the machining program. That is, because whether to execute marking onto the feedback data in the NC device can be externally selected, conventional feedback data including no marking and feedback data including marking can be obtained through switching of methods without preparing both of a machining program having marking executed and a machining program having no marking executed or both of the conventional NC device and the NC device that executes marking onto feedback data. Therefore, the NC device according to the present embodiment can be replaced as an NC device for a mechanism or an analysis unit that can use only the conventional feedback data. Furthermore, a range in which marking is to be executed can be easily changed without changing marks prompting marking or commands prompting marking in the machining program.

Third Embodiment

In a third embodiment of the present invention, whether to output feedback data can be selected. In the present embodiment, elements different from those of the first embodiment are explained.

Figure 11:
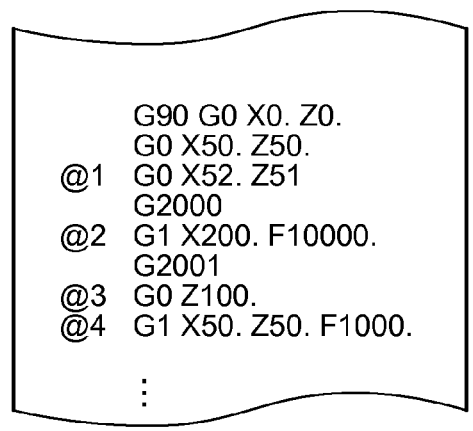
FIG. 11 shows a description example of a machining program according to a third embodiment.

The NC device has an identical configuration to that in the first embodiment (see FIG. 1). FIG. 11 shows a description example of a machining program according to the present embodiment. In the machining program 1, "G2000" is used as a program command for starting output of the feedback data 12 and "G2001" is used as a program command for ending the output of the feedback data 12.

Figure 12:
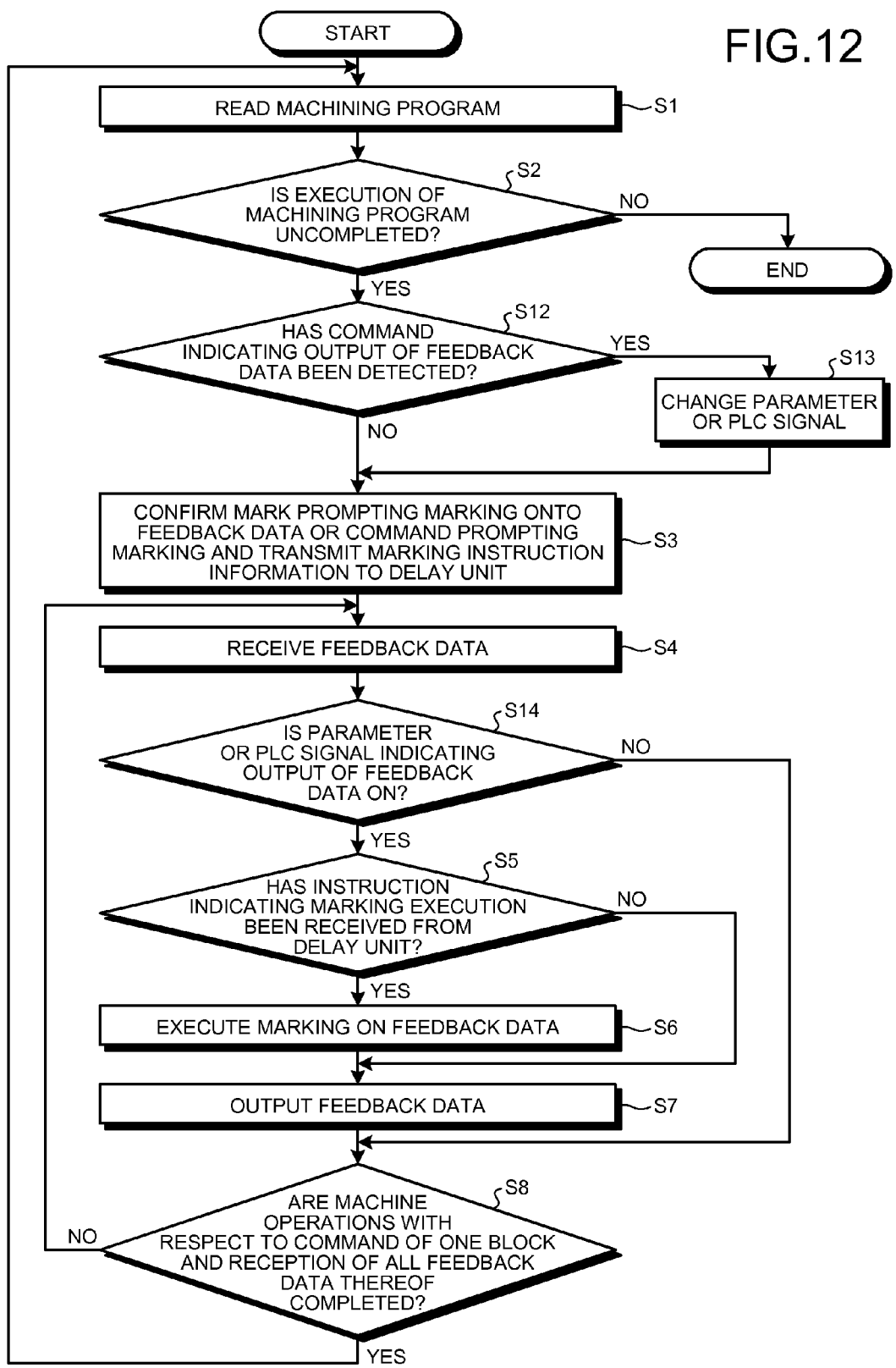
FIG. 12 is a flowchart showing reading of a machining program and marking processing onto feedback data according to the third embodiment.

An operation of the NC device in a case where marks or commands instructing marking onto the feedback data 12 are described in the machining program 1 is explained next with reference to FIG. 12. FIG. 12 is a flowchart showing reading of a machining program and marking processing onto feedback data according to the present embodiment.

When reading up to the end of the machining program 1 is uncompleted (YES at Step S2), the machining-program analysis unit 2 then confirms whether "G2000" or "G2001" indicating that the feedback data 12 can be output or not, respectively, is detected (Step S12). When detecting "G2000" or "2001" (YES at Step S12), the machining-program analysis unit 2 changes the statue of a parameter or the PLC signal (Step S13). For example, in the case of the PLC signal, the machining-program analysis unit 2 sets the PLC signal ON in the PLC-signal output unit 10 upon detection of "G2000" and sets the PLC signal OFF in the PLC-signal output unit 10 upon detection of "G2001". A parameter from the parameter output unit 11 can be substituted for the PLC signal. When neither "G2000" nor "2001" is detected (NO at Step S12) or the status of the parameter or the PLC signal is changed (Step S13), the machining-program analysis unit 2 proceeds to Step S3.

Next, upon reception of the feedback data 12 (Step S4), the feedback-data output unit 8 confirms whether the status of the parameter or the PLC signal indicating output of the feedback data 12 is ON (Step S14). When the status is ON (YES at Step S14), the feedback-data output unit 8 proceeds to Step S5. The following processes are identical to those in the first embodiment. When the status is OFF (NO at Step S14), the feedback-data output unit 8 proceeds to Step S8 without outputting the feedback data 12. The following processes are identical to those in the first embodiment. The parameter from the parameter output unit 11 can be substituted for the PLC signal.

Figure 13:
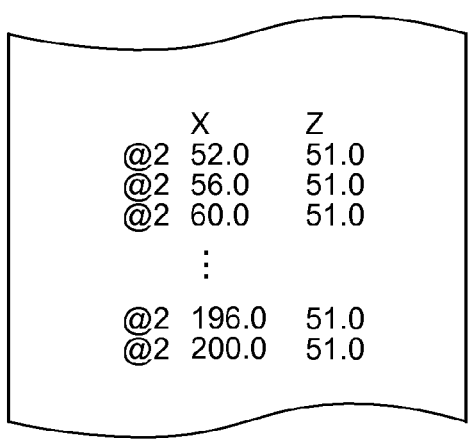
FIG. 13 shows an output example of feedback data output by an NC device according to the third embodiment.

FIG. 13 shows an output example of feedback data output by the NC device according to the present embodiment, to which marking is executed according to the machining program shown in FIG. 11. Only the feedback data 12 of commands within a range enclosed by "G2000" and "G2001" among commands to which marks (@+number) prompting marking are attached is particularly output.

As explained above, according to the present embodiment, whether to output feedback data with marking can be adjusted according to commands in the machining program and manipulation of the parameter or the PLC signal from outside. Accordingly, only the feedback data before and after the commands as analysis targets in the machining program can be obtained as outputs in marked states.

In this way, the NC device can adjust a timing when the feedback data with marking is output independently of marking. Therefore, a problem that the amount of the feedback data as an analysis target becomes vast can be suppressed, and effort required for the analysis and memory cost necessary for data accumulation can be reduced. That is, in the NC device, because it is possible to narrow down the marked feedback data to output feedback data before and after program commands as analysis target, memory cost of a storage device internal or external to the NC device, which is necessary for accumulation of the feedback data, can be suppressed and the size of data as the analysis target can be suppressed at the same time. Therefore, the work for the analysis can be performed efficiently.

Fourth Embodiment

In a fourth embodiment of the present invention, with respect to a program command of one block with a marking instruction, marking is executed onto only first piece of feedback data. In the present embodiment, elements different from those of the first embodiment are explained.

The NC device has an identical configuration to that in the first embodiment (see FIG. 1). A description example of the machining program 2 (see FIG. 4) to be used and a flowchart of processes performed in the NC device (see FIG. 3) are also identical to those in the first embodiment.

In this case, in FIG. 3, the machining-program analysis unit 2 checks whether a mark prompting marking onto the feedback data 12 or a command prompting the marking is included in each block of the read machining program 1 and transmits marking instruction information to the delay unit 9 at one shot (only once) (Step S3). The feedback-data output unit 8 then receives instruction information indicating marking execution from the delay unit 9 at one shot (only once) (YES at Step S5). Accordingly, when plural pieces of feedback data 12 correspond to one block in the read machining program 1, marking is executed only onto a piece of the feedback data 12 indicating the first operation result, unlike the first embodiment.

Figure 14:
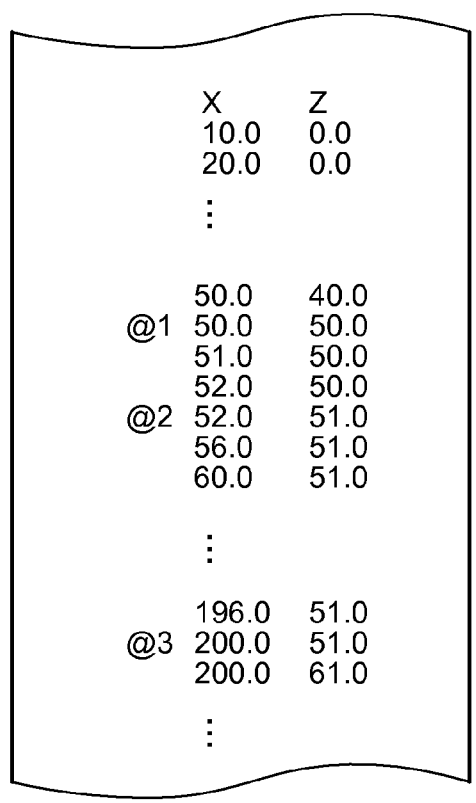
FIG. 14 shows an output example of feedback data output by an NC device according to a fourth embodiment.

FIG. 14 shows an output example of feedback data output by the NC device according to the present embodiment. As compared to the first embodiment (see FIG. 6), it can be seen that marking is executed only onto the first piece of feedback data 12 among plural pieces of feedback data 12 corresponding to the same block.

As explained above, according to the present embodiment, because only feedback data of a time when reception of operation results according to a program command is started is marked, phase (timing) alignment between a command trajectory according to the machining program and the feedback data can be easily performed by extracting feedback data from the marked data.

In this way, because the NC device highlights only feedback data of a time when reception of operation results according to a program command is started, an analysis focused on a timing of the start or the end of the program command can be easily performed. That is, in the NC device, when the start of a command trajectory of a machining program and marked feedback data are aligned, phases of the command trajectory and the feedback data are matched and thus the work required for such phase alignment at the time of a feedback data analysis can be omitted, which improves the work efficiency.

Fifth Embodiment

In a fifth embodiment of the present invention, marking is executed at a start time and an end time of feedback data corresponding to a specific command in a machining program. In the present embodiment, elements different from those of the first embodiment are explained.

The NC device has an identical configuration to that in the first embodiment (see FIG. 1). In a description example of the machining program 2 according to the present embodiment, a specific command, for example, a cutting command in marked blocks are a target in the format shown in FIG. 4 in the first embodiment.

Figure 15:
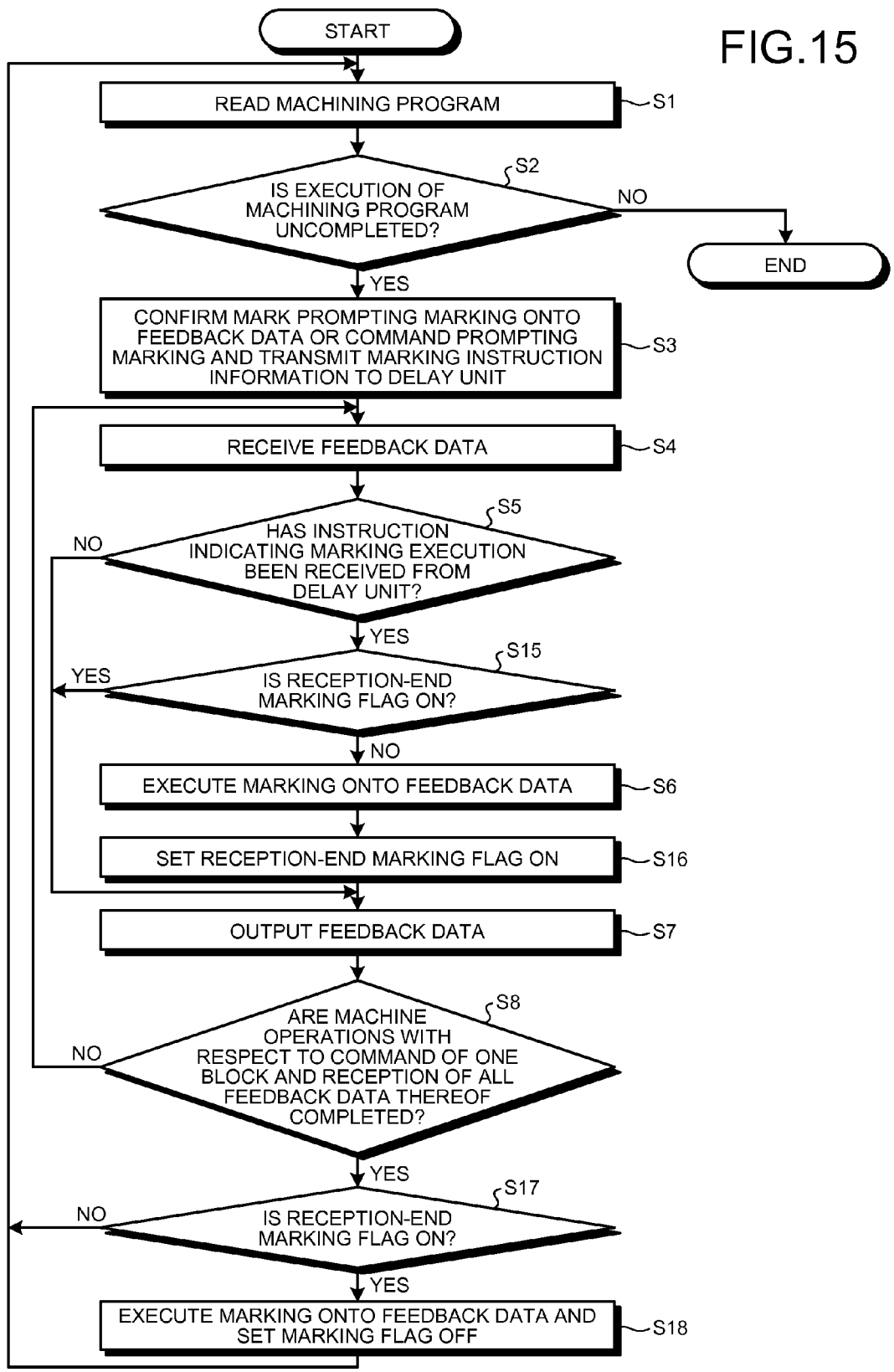
FIG. 15 is a flowchart showing reading of a machining program and marking processing onto feedback data according to a fifth embodiment.

An operation of the NC device in a case where marks or commands instructing marking onto the feedback data 12 are described in the machining program 1 is explained next with reference to FIG. 15. FIG. 15 is a flowchart showing reading of a machining program and marking processing onto feedback data according to the present embodiment.

The machining-program analysis unit 2 transmits instruction information indicating marking onto the feedback data 12 only in a case of a specific machining shape command, for example, a cutting command in marked blocks at Step S3 to the delay unit 9.

Next, when receiving instruction information indicating marking execution from the delay unit 9 (YES at Step S5), the feedback-data output unit 8 confirms whether a reception-end marking flag is ON (Step S15). When the reception-end marking flag is OFF (NO at Step S15), the feedback-data output unit 8 executes marking onto the feedback data 12 (Step S6), sets the reception-end marking flag ON (Step S16), and outputs the feedback data 12 (Step S7). When reception of feedback data of all machine operations for a command of one block read at Step S1 is not completed (NO at Step S8), the feedback-data output unit 8 returns to Step S4 to receive the next feedback data.

Next, when receiving the instruction information indicating marking execution from the delay unit 9 (YES at Step S5), the feedback-data output unit 8 confirms whether the reception-end marking flag is ON (Step S15). When the reception-end marking flag is ON (YES at Step S15), the feedback-data output unit 8 outputs the feedback data 12 without executing marking onto the feedback data 12 (Step S7). When reception of feedback data of all machine operations for a command of one block read at Step S1 is not completed (NO at Step S8), the feedback-data output unit 8 returns to Step S4 to receive the next feedback data 12. The feedback-data output unit 8 repeatedly performs these operations.

When receiving the instruction information indicating marking execution from the delay unit (YES at Step S5), the feedback-data output unit 8 confirms whether the reception-end marking flag is ON (Step S15). When the reception-end marking flag is ON (YES at Step S15), the feedback-data output unit 8 outputs the feedback data 12 without executing marking onto the feedback data 12 (Step S7). When reception of the feedback data 12 of all the machine operations for the command of one block read at Step S1 is completed (YES at Step S8), the reception-end marking flag is ON (YES at Step S17) and thus the feedback-data output unit 8 executes marking onto the feedback data 12 and sets the reception-end marking flag OFF (Step S18). The processing returns to Step S1 and the machining-program analysis unit 2 reads blocks (commands) of the next machining program 1.

In a case where the reception-end marking flag is continuously OFF and when reception of the feedback data 12 of all the machine operations for the command of one block read at Step S1 is completed (YES at Step S8), the feedback-data output unit 8 directly returns to Step S1 and then the machining-program analysis unit 2 reads blocks (commands) of the next machining program 1 because the reception-end marking flag is OFF (NO at Step S17).

Figure 16:
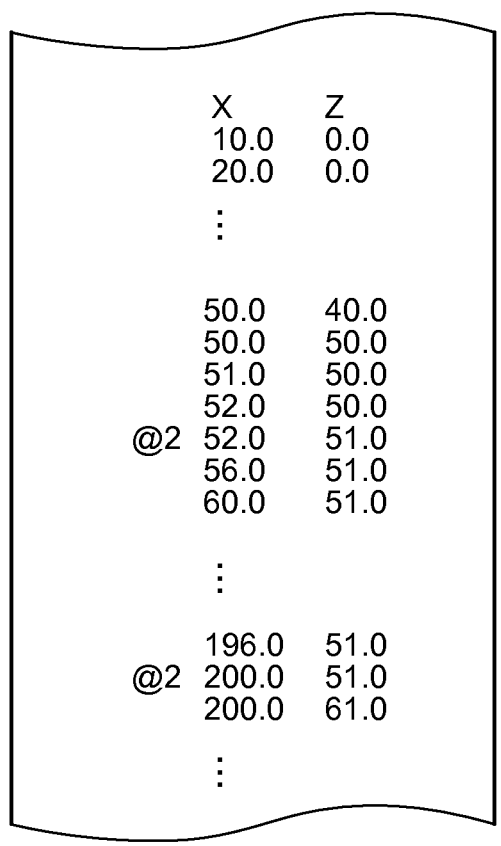
FIG. 16 shows an output example of feedback data output by the NC device according to the fifth embodiment.

FIG. 16 shows an output example of feedback data output by the NC device according to the present embodiment. A start time and an end time of reception of the feedback data 12 for a command of one block are marked. When compared with the feedback data 12 in the fourth embodiment (see FIG. 14), the feedback data 12 in the present embodiment is different in that marking is executed onto only the feedback data 12 corresponding to a cutting command (G01, for example) of the feedback data 12 and that marking is executed once again at the completion time of the command in addition to the start time thereof as shown in FIG. 16.

While a method of executing marking onto the feedback data 12 when a block including a cutting command and marking is detected has been explained, marking can be executed onto the feedback data 12, for example, to show a correspondence when a block of a cutting command without marking is detected.

As described above, according to the present embodiment, marking is executed only onto feedback data of the start time and the end time of a specific command, for example, a cutting command related to a machining shape. Accordingly, by collecting feedback data sandwiched by marks, an actual machining shape can be easily extracted from the feedback data.

In this way, the NC device can execute marking onto feedback data of the start time and the end time of a cutting command related to a machining shape and thus an actual machining shape can be analyzed without effort only by collecting feedback data sandwiched by marks. That is, in the NC device, because marking is executed onto feedback data corresponding to the start and the end of a cutting command, feedback data sandwiched by marks can be extracted and used as an actual machining shape for an analysis. Therefore, the work required to extract a machining shape from the feedback data becomes easier and the work efficiency is improved.

REFERENCE SIGNS LIST 1 machining program
2 machining-program analysis unit
3 command-position generation unit
4 command-status storage unit
5 communication processing unit
6 servo amplifier
7 servo motor
8 feedback-data output unit
9 delay unit
10 PLC-signal output unit
11 parameter output unit
12 feedback data
13 screen display unit

The invention claimed is:

1. A numerical control device that inputs a machining program to control an operation of a machine tool and outputs feedback data obtained as a result of the operation of the machine tool, the numerical control device comprising:
   a machining-program analysis unit that analyzes the machining program having a machining shape command to which a mark or a specific program command is attached and that outputs a marking instruction;
   a delay unit that delays the marking instruction until the feedback data indicating a result of an operation of the machine tool based on the machining shape command is obtained; and
   a feedback-data output unit that, in response to having detected the feedback data and the delayed marking instruction, executes, onto the feedback data, marking corresponding to the mark or the specific program command attached to the machining shape command and outputs the feedback data.

2. The numerical control device according to claim 1, wherein the feedback-data output unit executes marking onto the feedback data according to a program command instructing a start and an end of the marking.

3. The numerical control device according to claim 1, wherein the feedback-data output unit outputs the feedback data according to a program command instructing a start and an end of output of the feedback data.

4. The numerical control device according to claim 1, wherein the feedback-data output unit executes marking onto first feedback data among a plurality of pieces of feedback data corresponding to the machining shape command.

5. The numerical control device according to claim 1, wherein the feedback-data output unit executes marking onto feedback data corresponding to a start and an end of a specific machining shape command among a plurality of pieces of feedback data corresponding to the specific machining shape command.

* * * * *